United States Patent [19]

Coetzer et al.

[11] Patent Number: 4,546,055
[45] Date of Patent: Oct. 8, 1985

[54] ELECTROCHEMICAL CELL

[75] Inventors: Johan Coetzer; Roy C. Galloway, both of Pretoria, South Africa; Roger J. Bones, Abingdon; David A. Teagle, Swindon; Patrick T. Moseley, Didcot, all of England

[73] Assignee: Lilliwyte Societe Anonyme, Luxembourg, Luxembourg

[21] Appl. No.: 446,432

[22] Filed: Dec. 2, 1982

[30] Foreign Application Priority Data

Dec. 10, 1981 [GB] United Kingdom ............... 8137343

[51] Int. Cl.$^4$ .......................................... H01M 10/39
[52] U.S. Cl. .................................... 429/103; 429/112
[58] Field of Search ............................... 429/103, 112

[56] References Cited

U.S. PATENT DOCUMENTS

| 3,877,984 | 4/1975 | Werth . | |
| 4,069,372 | 1/1978 | Voinov | 429/104 |
| 4,287,268 | 9/1981 | Coetzer | 429/103 |
| 4,287,271 | 9/1981 | Coetzer | 429/104 |
| 4,288,506 | 9/1981 | Coetzer | 429/199 |

OTHER PUBLICATIONS

Fung, Mamantov, Electrochemistry of Titanium(II) in AlCl$_3$+NaCl Melts, 35 J. Electroanal. Chem. 27 (1972).
Oye, Gruen, Cobalt(ii) Species in Fused Chloride Solvents 4(8) Inorg. Chem. 1173 (1965).
Boxall, Jones, Osteryoung, Electrochemical Studes in Ag, Fe, & Cu Species in AlCl$_3$-NaCl Melts, J. Electrochem. Soc. 212 (1974).
Gilbert, Osteryoung, Electrochemistry of Ni(II) & the Behav. of Oxide Ions in Chloroaluminate Melts, J. Amer. Soc. 2725 (Apr. 1978).
Miller, Exploring the Cell: Sodium/$\beta$-Alumina/Cupric Between 136° and 200° C., Nasa Technical Mem. Nasa TMS-3245 (1975).
Chreitzberg, Consolloy, Manning, Sklarchuk, Performance of Molten Salt Sodium/$\beta$-Alumina/SbCl3 Cells, 3 J. of Power Sources 201 (1978).

Primary Examiner—Donald L. Walton
Attorney, Agent, or Firm—Arnold, White & Durkee

[57] ABSTRACT

An electrochemical cell is provided with a molten sodium anode and a molten sodium aluminium halide salt electrolyte. The cathode comprises FeCl$_2$, NiCl$_2$, CoCl$_2$ or CrCl$_2$ as active cathode substance dispersed in an electronically conductive electrolyte-permeable matrix which is impregnated by the electrolyte. Between the anode and the electrolyte, and isolating them from each other, is a solid conductor of sodium ions or a micromolecular sieve which contains sodium sorbed therein. The proportions of sodium and aluminium ions in the electrolyte are selected so that the solubility of the active cathode substance in the electrolyte is at or near its minimum.

30 Claims, 4 Drawing Figures

ELECTROCHEMICAL CELL

This invention relates to an electrochemical cell. In particular, it relates to a rechargeable electrochemical cell suitable for secondary use.

According to the invention, an electrochemical cell comprises a sodium anode which is molten at the operating temperature of the cell, a sodium aluminium halide molten salt electrolyte which is also molten at the operating temperature of the cell, a cathode which is impregnated by the electrolyte and which comprises, as the electrochemically active cathode substance of the cell, a transition metal chloride selected from the group consisting in $FeCl_2$, $NiCl_2$, $CoCl_2$ and $CrCl_2$ dispersed in an electrolyte-permeable matrix which is electronically conductive, and, between the anode and the electrolyte and isolating the anode from the electrolyte, a solid conductor of sodium ions or a micromolecular sieve which contains sodium sorbed therein, the proportions of sodium ions and aluminium ions in the electrolyte being selected so that the solubility of the active cathode substance in the molten electrolyte is at or near its minimum.

By 'isolating' is meant that any ionic sodium or metallic sodium moving from the anode to the electrolyte or vice versa, has to pass through the internal crystal structure of the solid conductor or through the microporous interior of the carrier, as the case may be.

The electrolyte is conveniently a sodium aluminium chloride molten salt electrolyte, which can, depending on the proportions of sodium and aluminium, have a melting point of the order of 150° C. or less, and wherein, also depending on its composition, the active cathode substance can be virtually insoluble. This electrolyte may contain a minor proportion of up to, say, 10% by mass and usually less, of a dopant such as an alkali metal halide other than sodium chloride, by means of which its melting point is reduced. The dopant may thus comprise an alkali metal fluoride, but the proportions of the constituents of the electrolyte should be selected such that the solubility of the active cathode substance in the electrolyte is kept to a minimum.

The Applicant has found that the minimum solubility of the active cathode substances in the sodium aluminium chloride electrolytes (which may be doped as described above), occurs when the molar ratio of the alkali metal halide to the aluminium halide is about 1:1. In other words, the relative quantities of said alkali metal ions, aluminium ions and halide ions should conform substantially with the stoichiometric product:

$$M\ Al\ X_4$$

wherein
M represents alkali metal cations; and
X represents halide anions.
Such electrolytes are among those described in the Applicant's U.S. Pat. No. 4,287,271.

In this way, the proportions of the constituents can be selected so that the melting point of the electrolyte at atmospheric pressure is below 140° C. Minor proportions of dopants may be tolerated in the electrolyte, e.g. substances which will ionize in the molten electrolyte to provide ions which affect the electrolytic action of the electrolyte or, as mentioned above, substances which reduce its melting point, but their nature and quantity should be insufficient to alter the essential character of the electrolyte as a sodium aluminium chloride electrolyte, wherein the M Al $X_4$ product is maintained.

When the cell contains a solid conductor of sodium ions, said solid conductor may be beta-alumina or nasicon.

Instead, when the cell contains a micromolecular sieve this carrier can be regarded as a conductor of sodium metal and/or sodium ions, depending on the mechanism whereby sodium is transported therethrough.

By 'micromolecular sieve' is meant a molecular sieve having interconnected cavities and/or channels in its interior and windows and/or pores in its surface leading to said cavities and channels, the windows, pores, cavities and/or channels having a size of not more than 50 Angstroms and preferably less than 20 Angstroms.

Suitable micromolecular sieves are mineral micromolecular sieves, ie inorganic lattice or framework structures such as tectosilicates, eg the zeolites 13X, 3A, 4A or the like, although certain essentially organic micromolecular sieves such as clathrates may, in certain circumstances, be suitable.

The active cathode substance should preferably be evenly dispersed throughout the matrix; and it may be in finely divided particulate form and/or it may adhere as fine particles or a thin layer to the matrix, preferably so that there are no large particles or thick layers of active cathode substance present, and preferably so that none of the active cathode substance is spaced physically from the material of the matrix, which acts as a current collector, by an excessive spacing, eg in large cavities in the matrix. In other words, the active cathode substance preferably should be close to or adherent to the material of the matrix, and should be as thinly spread as possible, consistent with the porosity of the matrix and the quantity of cathode substance required to be present. Large particles or thick layers of active cathode substance will not prevent the cell from working, but will merely be inefficient, a proportion of the active cathode substance remote from the cathode matrix material amounting merely to dead weight.

As the electrochemically active cathode substance, $FeCl_2$ (ferrous chloride) is attractive, for reasons of availability and cost, and because it can be substantially insoluble in a sodium aluminium chloride electrolyte in which the molar ratio of sodium chloride to aluminium chloride is 1:1.

The matrix of the cathode in turn can be any suitable electronically conductive substance capable of providing access to the cathode substance of the sodium ions of the electrolyte. Carbon in the form of graphite may be used, or a porous matrix of the transition metal itself can be used. Suitable solid artifacts for use as cathodes can be made from graphite or the metal, for use in the cathodes, as described hereunder.

The transition metal chlorides of the cathodes of the present invention can be obtained from the metals in question or from compounds of the metals in question which can be treated to yield the desired chloride, eg refractory compounds of the transition metal, or other chlorides thereof. In each case, the oxidation state of the metal in the metal chloride in the cathode should be as low as possible, and the presence of higher chlorides of the metal should be avoided, so that solubility of cathode material in the electrolyte melt is avoided as far as is practicable.

Thus, a sintered artifact can be made of the transition metal in question, in a manner similar to that used for the construction of porous iron electrodes. This can then be chlorinated electrochemically, or chemically by reaction with chlorine gas, or with chlorine gas diluted by a suitable diluent.

When electrochemical chlorination is being employed, the cathode so formed can be removed to the cell where it is to be used, or if it is chlorinated in situ, the original composition of the electrolyte should be selected, or the electrolyte should be modified after chlorination, so that the electrochemically active cathode substance is substantially insoluble therein.

If chemical chlorination has been used, subsequent heating under vacuum can be employed to sublime off unwanted volatiles, such as any $FeCl_3$ obtained in making an $FeCl_2/Fe$ cathode artifact. According to this method of manufacture, the resultant cathode is the desired transition metal chloride in question, finely dispersed through a porous matrix of the transition metal, which is an electronic conductor and can be electrochemically active, depending on the cell environment, and can thus further enhance cell capacity.

Instead, a refractory compound of the transition metal in question, such as a carbide thereof, can be mixed with a small quantity of a carbon-forming binder, eg phenol formaldehyde resin. The resulting mix is then pressed into electrode shape and the resin can be cracked in a vacuum at temperatures in excess of 600° C., the temperature being selected to pyrolyse the binder to conductive carbon and to degrade the carbide to the metal and graphite. Thus, in the case of iron, $Fe_3C$ can be degraded to alpha iron and graphite. The resulting electrode is a fine dispersion of alpha iron and carbon which can be chlorinated by the method described above, the matrix comprising any conductive iron or graphite remaining after the chlorination.

Still further, the chloride itself can be finely divided and mixed with a suitable conducting medium for the matrix, such as graphite, and the cathode pressed as an artifact from the mixture.

In each case, prior to assembling the cell, the cathode must be loaded with the electrolyte with which it is to be used, and this can be effected by vacuum impregnation followed by pressurization, to promote complete penetration of the electrolyte into the artifact.

The invention will now be described, by way of non-limiting example, and with reference to the following illustrative Examples and drawings, in which.

Figure 4:
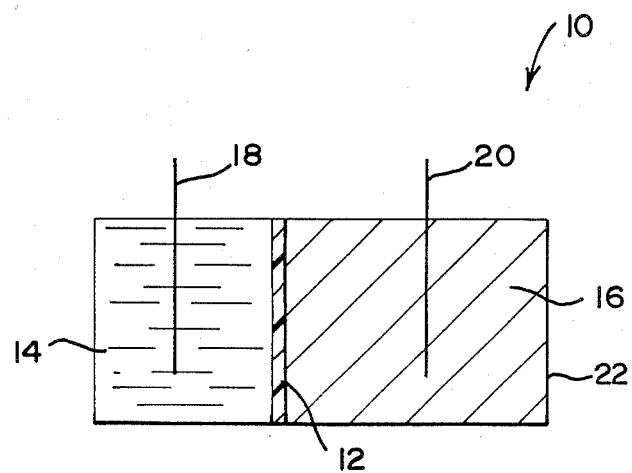
FIG. 4 shows schematically a cell according to the invention.

With reference first to FIG. 4 of the drawings, test cells 10 were made in accordance with the invention, assembled under an argon atmosphere. In each case, beta alumina 12 separated the sodium anode 14 from the electrolyte, and to ensure good wetting in use of the beta alumina 12 by the molten sodium 14, the beta alumina 12 and sodium 14 were preheated to 400° C. and cooled under argon. The cathode was then placed in position and sufficient molten electrolyte was added under argon, the electrolyte comprising an equimolar mix of sodium chloride and aluminum chloride. The cathode impregnated with electrolyte is shown at 16. The anode 14 and cathode 16 were arranged to have suitable current collectors respectively 18 and 20 in contact therewith, and the beta alumina 12 was arranged so that it formed a continuous barrier between the electrolyte and sodium anode 14, within a housing 22.

Test cells of this nature were used in the following examples:

EXAMPLE 1

A 5 g disc-shaped sintered iron electrode having a diameter of 30 mm and a thickness of 3 mm was chlorinated chemically by reaction with chlorine gas and heated under vacuum to sublime off volatile $FeCl_3$. From the uptake of chlorine, the discharge capacity was calculated to be approximately 0.6 Amp hr. It should be noted that experimental capacity was found to be in good agreement with calculated capacity. It was found that the charge-discharge process could represented as follows:

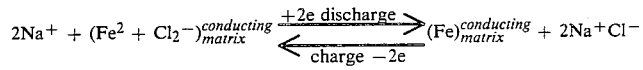

$$2Na^+ + (Fe^2 + Cl_2{-})_{matrix}^{conducting} \underset{\text{charge} -2e}{\overset{+2e \text{ discharge}}{\rightleftharpoons}} (Fe)_{matrix}^{conducting} + 2Na^+Cl^-$$

Figure 1:
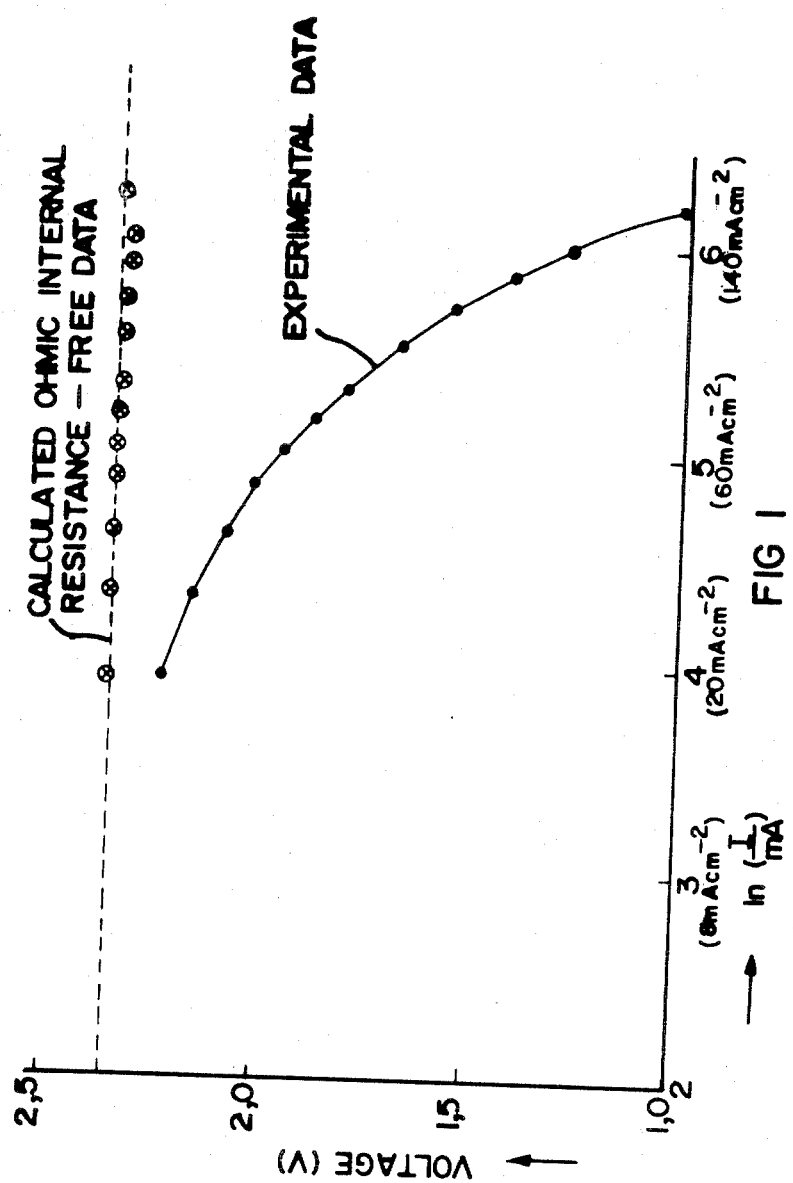
FIG. 1 shows a Tafel Plot at the start of the discharge of voltage vs current for a cell according to the invention.
Figure 2:
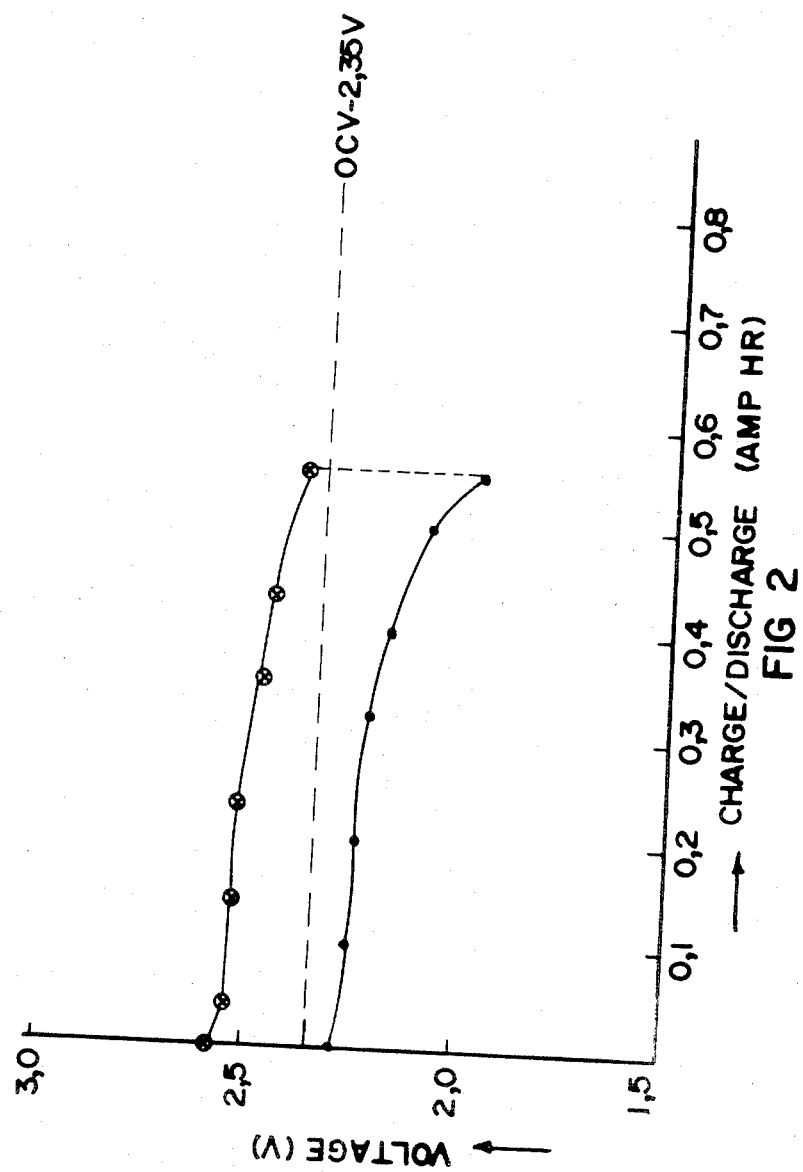
FIG. 2 shows a plot of voltage vs capacity for the 12th charge/discharge cycle of the cell of FIG. 1.

In the electrolyte melt $Na^+$ is the charge-carrying species. Reduction and oxidation of the iron takes place at the conducting matrix, with which the iron makes electronic contact. Charge transfer was found to be rapid and the cathode was found to tolerate high current densities, in excess of 150 $mAcm^{-2}$, with little cell polarisation. FIG. 1 shows a Tafel Plot at the start of discharge of voltage vs current for the cell, current being shown logarithmically. The ohmic internal resistance-free plot shows the absence of polarisation up to current densities in excess of 150 $mAcm^{-2}$, at a temperature of 180° C. FIG. 2 shows the twelfth charge-discharge cycle, i.e.:

Charge: 2.38 V–2.60 V, 5 hour rate
Discharge: 2.28 V–1.96 V, 5 hour rate
Capacity: 740 J $g^{-1}$ (excluding electrolyte)
Coulombic efficiency: 100%
Temperature: 230° C.
Current Density: 50 mA/$cm^2$
Open Circuit Voltage (O.C.V.): 2.35 V.

EXAMPLE 2

Figure 3:
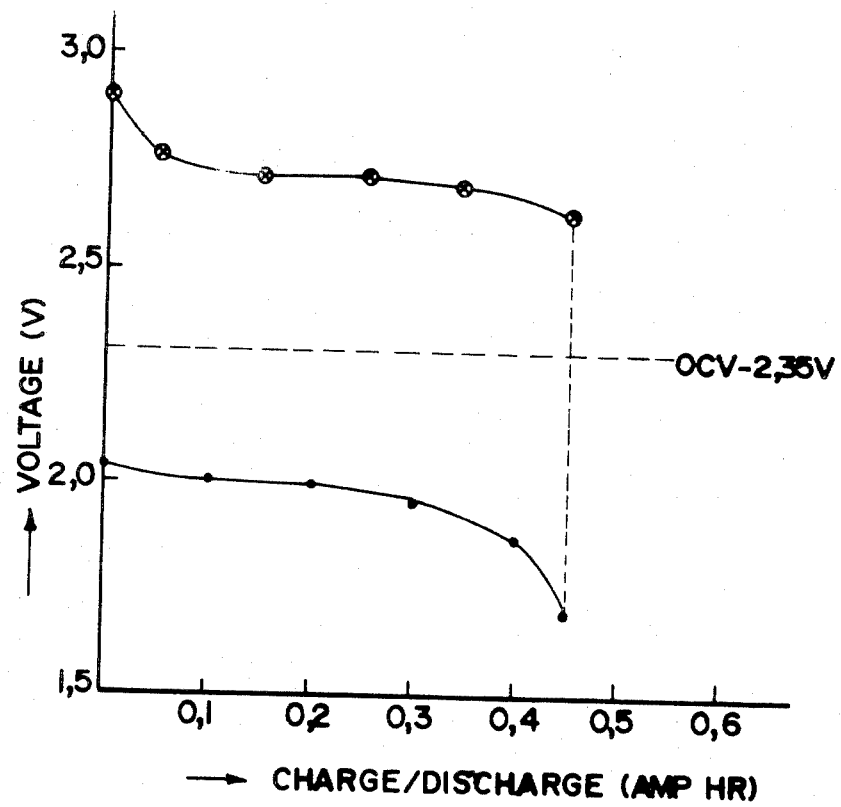
FIG. 3 shows a plot of voltage vs capacity for the 11th charge/discharge cycle of another cell according to the invention.

5 g of $Fe_3C$ (having a 325 mesh average particle size obtained from Cerac Inc.) together with 0.5 g phenol formaldehyde binder (obtained from Polyresin Products (Pty) Limited) were intimately mixed and then pressed in a uniaxial press (about 34 500 kPa) into a pellet which was heated under argon for a period and at a temperature (eg about 3 hours at 1000° C.) sufficient to effect breakdown of the $Fe_3C$ to alpha iron and graphite. The only identifiable crystalline products found were indeed alpha iron and graphite. The artifact was then chlorinated, as described with reference to Example 1, and the chlorine uptake gave an estimated capacity of 0.5 Amp hr, based on the calculated quantity of iron chloride present. As in Example 1, the experimental capacity was found to be in good agreement with the calculated capacity. FIG. 3 shows the eleventh charge-discharge cycle of this cell, i.e.:

Charge: 2.64–2.90 V, 5 hour rate
Discharge: 2.05–1.70 V, 5 hour rate
Capacity: 540 J g$^{-1}$ (excluding electrolyte)
Coulombic efficiency: 100%
Temperature: 230° C.
Current Density: 50 mA/cm$^2$
Open Circuit Voltage (O.C.V.): 2.35 V.

The present invention shows striking advantages, particularly as regards current density and the absence of any high internal resistance caused by polarization at high current densities, when compared with similar cells where the electrochemically active cathode material is soluble in the electrolyte. In the case of the latter, concentration polarization takes place and high internal resistances are encountered, so that only low current densities can be tolerated, rendering these cells unsuitable for high power applications such as automotive propulsion.

We claim:

1. An electrochemical cell which comprises a sodium anode which is molten at the operating temperature of the cell, a sodium aluminum chloride molten salt electrolyte which is also molten at the operating temperature of the cell, a cathode which is impregnated by the electrolyte and comprises, as the electrochemically active cathode substance of the cell, a transition metal chloride selected from the group consisting in FeCl$_2$, NiCl$_2$2, CoCl$_2$ and CrCl$_2$ dispersed in a matrix which is permeable by the electrolyte in liquid form and is electronically conductive, and, between the anode and the electrolyte and isolating the anode from the electrolyte, a solid conductor of sodium ions or a micromolecular sieve which contains sodium sorbed therein, the proportions of sodium ions and aluminum ions in the electrolyte being selected so that the active cathode substance is substantially insoluble in the molten electrolyte.

2. A cell as claimed in claim 1 in which the electrolyte is an undoped sodium aluminum chloride molten salt electrolyte.

3. A cell as claimed in claim 2, in which the electrolyte contains less than 10% by mass of an alkali metal halide dopant whereby its melting point is reduced, the proportions of alkali metal and aluminum ions and the proportion and nature of the dopant being selected so that the electrolyte has a melting Point of 150° C. or less.

4. A cell as claimed in claim 2, in which the molar ratio of alkali metal halide to aluminium halide in the electrolyte is substantially 1:1, the relative quantities of the alkali metal ions, aluminium ions and halide ions conforming substantially with the stoichiometric product:

MAlX$_4$ wherein:
M represents the alkali metal cations; and
X represents the halide anions.

5. A cell as claimed in claim 1, in which the anode is isolated from the electrolyte by a solid conductor of sodium ions selected from the group consisting in beta-alumina or nasicon.

6. A cell as claimed in claim 1, in which the anode is isolated from the electrolyte by a micromolecular sieve selected from the group consisting in zeolite 13X, zeolite 3A and zeolite 4A.

7. A cell as claimed in claim 1, in which the active cathode material is ferrous chloride (FeCl$_2$).

8. A cell as claimed in claim 1, in which the active cathode substance is evenly dispersed throughout the matrix, in finely divided particulate form or in the form of a thin layer adhering to the material of the matrix.

9. A cell as claimed in claim 1, in which the matrix of the cathode comprises carbon or the transition metal of the active cathode substance.

10. A cell as claimed in claim 1, in which the cathode comprises an artifact formed from the transition metal of the active cathode substance or a refractory compound thereof, which metal or compound has been chemically or electrochemically treated to convert said transition metal or compound into the active cathode material.

11. A cell as claimed in claim 10, in which a refractory compound of the transition metal has been heated to degrade it to the metal, and then has been chlorinated chemically or electrochemically.

12. A cell as claimed in claim 1, in which the cathode comprises an artifact formed from an evenly dispersed finely divided mixture of the active cathode substance and a suitable conducting medium which forms the matrix.

13. A cell as claimed in claim 1, in which the active cathode substance is NiCl$_2$.

14. A cell as claimed in claim 1, in which the active cathode substance is CoCl$_2$.

15. A cell as claimed in claim 1, in which the active cathode substance is CrCl$_2$.

16. An electrochemical cell which comprises: a sodium anode which is molten at the operating temperature of the cell; a sodium containing alkali metal aluminum halide molten salt electrolyte which is also molten at the operating temperature of the cell; a cathode including an electronically conductive matrix permeable by the electrolyte in liquid form and an electrochemically active cathode substance dispersed in the electrolyte permeated matrix, the active cathode substance comprising FeCl$_2$, NiCl$_2$, CoCl$_2$ or CrCl$_2$; and, between the anode and the electrolyte and isolating the anode from the electrolyte, a solid conductor of sodium ions or a micromolecular sieve which contains sodium sorbed therein; the proportions of alkali metal ions and aluminum ions in the electrolyte being selected so that the molar ration of alkali metal halide to aluminum halide in the electrolyte is substantially 1:1, the relative quantities of the alkali metal ions, aluminum ions and halide ions conforming substantially with the stoichiometric product MAlX$_4$ where
M represents the alkali metal cations, and
X represents the halide anions,
thereby to ensure that the active cathode substance is substantially insoluble in the molten electrolyte.

17. The cell in accordance with claim 16, wherein the electrolyte comprises a sodium aluminum halide salt.

18. The cell in accordance with claim 16, wherein the electrolyte comprises a sodium aluminum chloride salt.

19. An electrochemical cell which comprises: a sodium anode which is molten at the operating temperature of the cell; a sodium aluminum chloride molten salt electrolyte which is also molten at the operating temperature of the cell; a cathode which is impregnated by the electrolyte and whose electrochemically active cathode substance comprises one or more of FeCl$_2$, NiCl$_2$, CoCl$_2$ and CrCl$_2$ dispersed in a matrix which is permeable by the electrolyte liquid and which is electronically conductive; and, between the anode and the electrolyte and isolating the anode from the electrolyte, a solid conductor of sodium ions, sodium ions being the only alkali metal ions in the liquid electrolyte and the proportions of sodium ions and aluminum ions in the electrolyte being selected so that the molar ratio of sodium chloride to aluminum chloride in the electrolyte is substantially 1:1, the relative quantities of the sodium ions, aluminum ions and chloride ions conforming substantially with the stoichiometric product NaAlCl$_4$ thereby to ensure that the active cathode substance is substantially insoluble in the molten electrolyte.

20. An electrochemical cell comprising:
a sodium anode which is molten at the operating temperature of the cell;
a sodium-containing aluminum halide electrolyte which is molten at the operating temperature of the cell;
an electronically conductive matrix permeated by the electrolyte, the matrix being permeable by the electrolyte when the electrolyte is in liquid form;
an active cathode substance comprising FeCl$_2$, NiCl$_2$, CoCl$_2$, or CrCl$_2$ dispersed in the matrix in operable contact with the electrolyte;
a separator between the anode and the electrolyte which isolates the anode from the electrolyte, the separator being a conductor of sodium ions; and
the electrolyte having proportionate amounts of alkali metal ions and aluminum ions so that the active cathode substance is substantially insoluble in the electrolyte.

21. The cell in accordance with claim 20, wherein the separator comprises a beta alumina solid conductor of sodium ions.

22. The cell in accordance with claim 20, wherein the separator comprises a nasicon solid conductor of sodium ions.

23. The cell in accordance with claim 20, wherein the separator comprises a micromolecular sieve.

24. The cell in accordance with claim 23, the micromolecular sieve including windows, pores, cavities and channels having a size not more than 50 Angstroms.

25. The cell in accordance with claim 20, wherein the electrolyte comprises a sodium aluminum chloride molten salt.

26. The cell in accordance with claim 20, wherein the electrolyte comprises about a 1:1 molar ratio of alkali metal halide to aluminum halide.

27. The cell in accordance with claim 20, wherein the electrolyte conforms substantially with the stoichiometric product:

M Al X$_4$ where
M represents alkali metal cations, and
X represents halide anions.

28. The cell in accordance with claim 20, wherein the electrolyte includes a minor proportion of dopant for reducing the electrolyte melting point.

29. The cell in accordance with claim 20, wherein the matrix is a solid porous material comprising the transition metal of the active cathode substance.

30. The cell in accordance with claim 20, the matrix comprising a solid porous graphite material.

* * * * *